No. 831,986. PATENTED SEPT. 25, 1906.
P. PINTO.
DUMPING WAGON.
APPLICATION FILED OCT. 5, 1905.
4 SHEETS—SHEET 1.
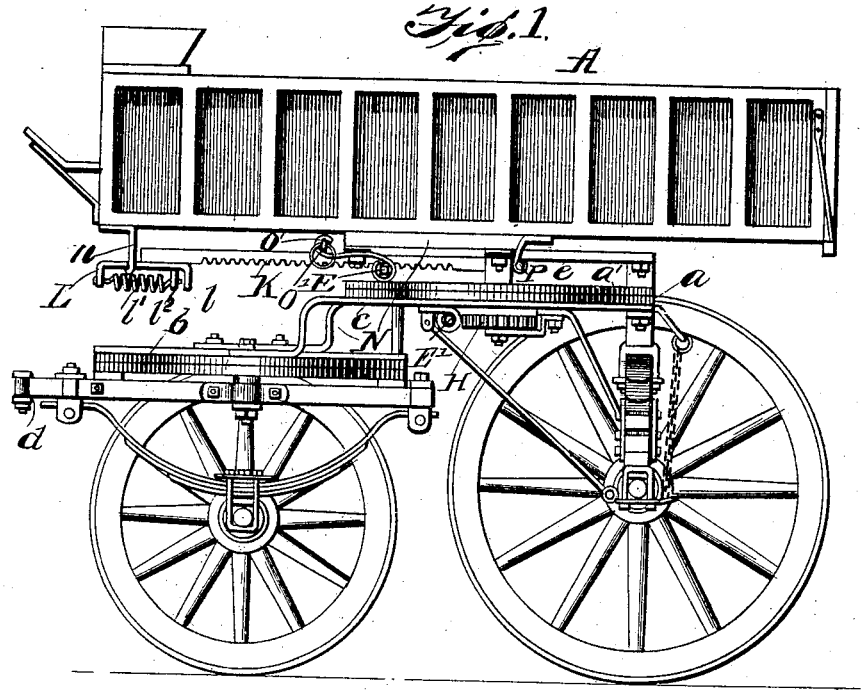
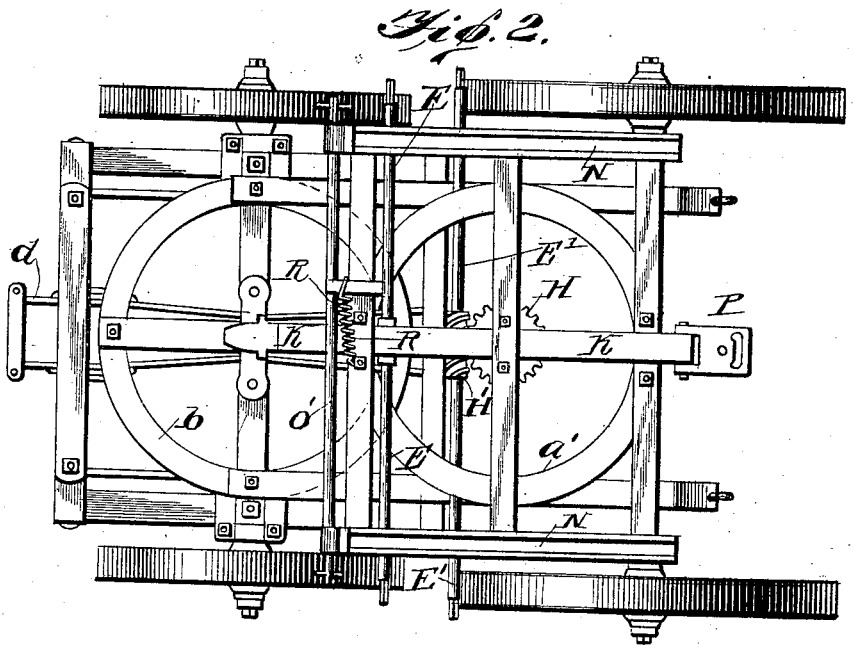
WITNESSES
INVENTOR
PETER PINTO
BY
ATTORNEYS

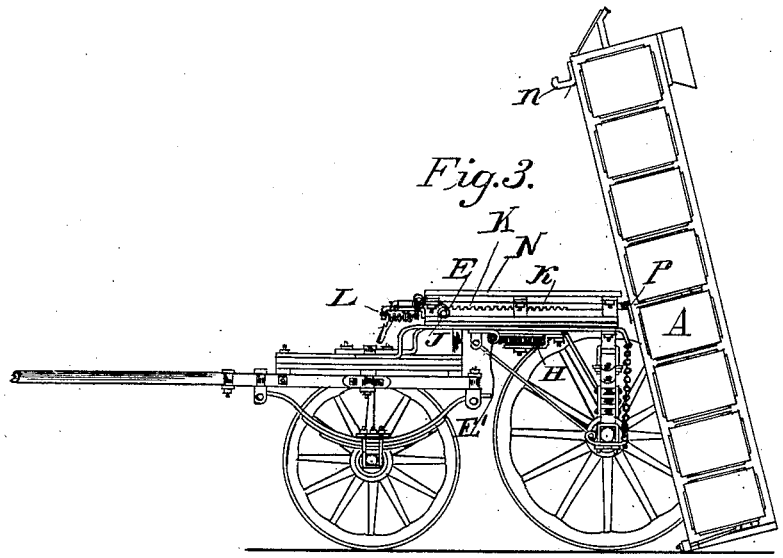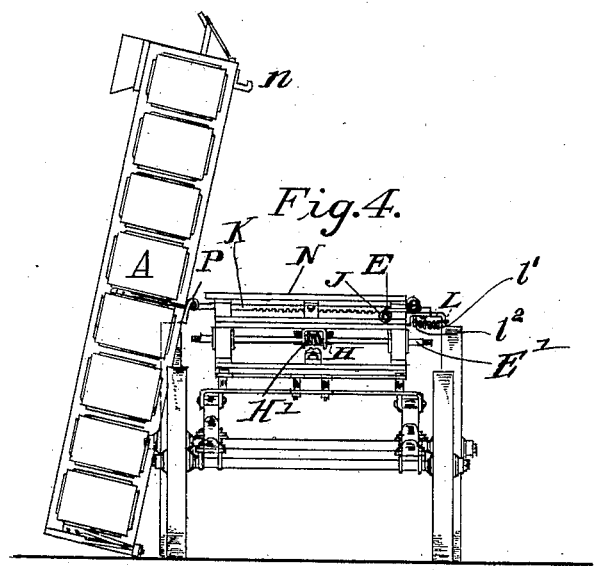

No. 831,986. PATENTED SEPT. 25, 1906.
P. PINTO.
DUMPING WAGON.
APPLICATION FILED OCT. 5, 1905.
4 SHEETS—SHEET 3.
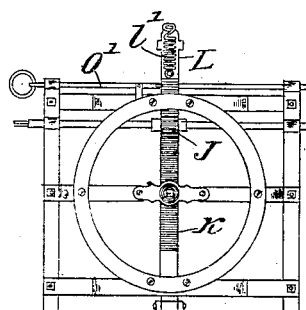
Fig.5.
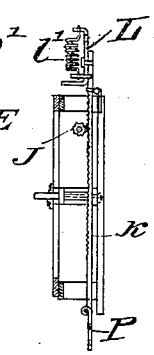
Fig.6.
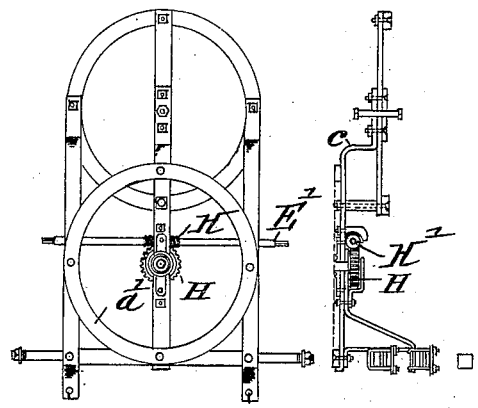
Fig.7.
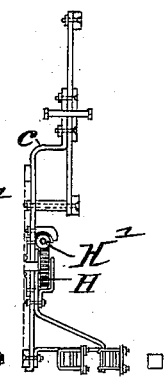
Fig.7a
Fig.6a
Fig.6b
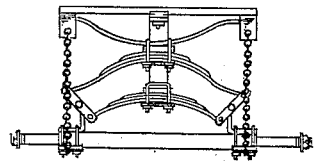
Fig.7b
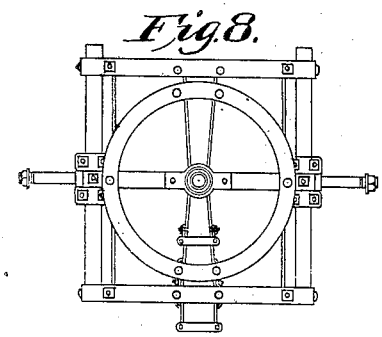
Fig.8.
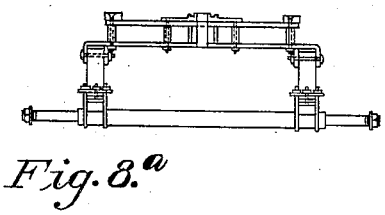
Fig.8.a
WITNESSES:
William Schnaufer
Stephen S. Lappin
Peter Pinto INVENTOR
BY
Thomas E. Hamel ATTORNEY
THE NORRIS PETERS CO., WASHINGTON, D. C.

No. 831,986. PATENTED SEPT. 25, 1906.
P. PINTO.
DUMPING WAGON.
APPLICATION FILED OCT. 5, 1905.
4 SHEETS—SHEET 4.
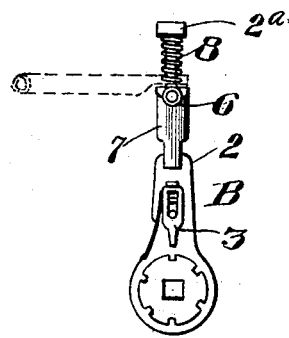
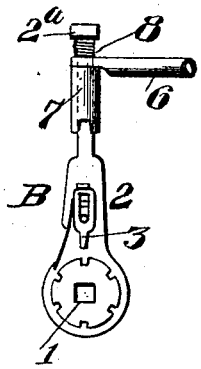
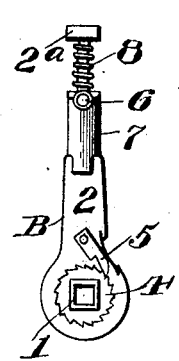
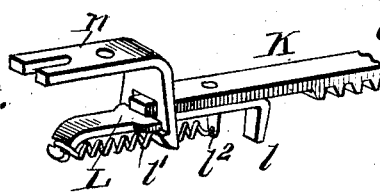
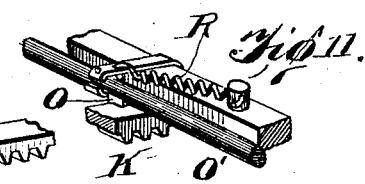
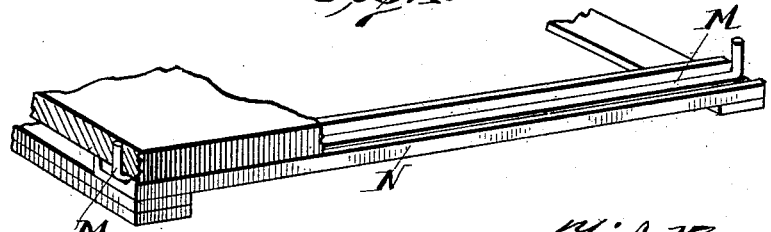
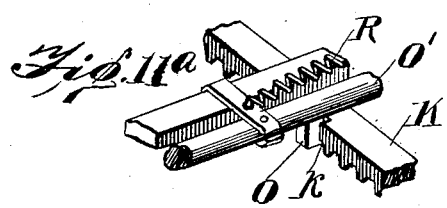
WITNESSES
INVENTOR
PETER PINTO
BY Munn & Co.
ATTORNEYS
THE NORRIS PETERS CO., WASHINGTON, D. C.

UNITED STATES PATENT OFFICE.

PETER PINTO, OF NEW YORK, N. Y.

DUMPING-WAGON.

No. 831,986.  Specification of Letters Patent.  Patented Sept. 25, 1906.

Application filed October 5, 1905. Serial No. 281,562.

*To all whom it may concern:*

Be it known that I, PETER PINTO, a citizen of the United States, residing at New York, in the county of New York and State of New York, have made certain Improvements in Dumping-Wagons, of which the following is a specification.

My invention is an improvement in the class of wagons for trucking or heavy carting in which the box or wagon-body is adapted to be turned or tilted for dumping the load.

My invention is embodied in the construction, combination, and arrangement of parts hereinafter described, and illustrated in the accompanying drawings, in which—

Figure 1 is a side view of my improved dumping-wagon. Fig. 2 is a plan view, the box or body being removed. Fig. 3 is a side view showing the wagon box or body tilted to the rear as required for dumping the load. Fig. 4 is an elevation showing the wagon-box tilted to the side for dumping. Fig. 5 is a plan view of the rear portion of the frame or support upon which the wagon-body is secured. Fig. 6 is a longitudinal section of the same. Fig. 6$^a$ is a transverse vertical section thereof, and Fig. 6$^b$ is a cross-section of a portion of the rear frame. Fig. 7 is a plan view including the rear axle, the rear circular bearing, and the fifth-wheel. Fig. 7$^a$ is a longitudinal section of the parts shown in Fig. 7, and Fig. 7$^b$ is a rear end view of the rear portion of the running-gear minus the wheels. Fig. 8 is a plan view of the front running-gear including the fifth-wheel, and Fig. 8$^a$ includes rear and side views of the gear shown in Fig. 8. Figs. 9, 9$^a$, and 9$^b$ are detail views of a device for turning certain shafts as required to adjust the wagon-body for dumping its load. Fig. 10 is a perspective view showing the spring-catch for holding the wagon-body in the horizontal position on the supporting-frame. Figs. 11 and 11$^a$ are perspective views illustrating a device for locking the wagon-body against sliding on its support when in use. Fig. 12 is a perspective view illustrating a longitudinal guide for the wagon-body when being slid for dumping. Fig. 13 is a cross-section of the part shown in Fig. 12.

As shown in Fig. 1, a rectangular wagon box or body A is mounted on running-gear, including front and rear axles having broad-tire wheels, the front wheels being the smaller and the front axle somewhat shorter than the rear one. The frame which is supported upon the springs of the rear axle includes a rear circle $a$ and a fifth-wheel $b$, the parts connecting them being metal bars $c$ of suitable strength and rigidity, the same being bolted to the under side of the rear circle $a$ and to the upper side of the circle or fifth-wheel $b$. It will be understood that a pivot or king-bolt is applied for connecting the fifth-wheel $b$ with the circle of the front truck. In practice a tongue or pole (not shown) is inserted and duly supported between the guides $d$, so that the front truck may be turned to any required angle. The body A is secured by a frame $e$ to a circle $a'$, which rests and is adapted to turn upon the circle $a$. A worm-gear H is fixed upon the pintle or pivot-bolt, which connects the box-supporting frame $e$ with the circle $a$, forming a part of the frame of the running-gear. The worm-wheel H meshes with a worm H', (see Figs. 2, 7, and 7$^a$,) the latter being keyed upon a horizontal shaft E', that extends transversely of the frame $e$ and is supported in hangers on the under side of the same. Its ends are squared, as shown in Fig. 2, to adapt it for application of a turning device or crank B, which is shown in detail in Figs. 9, 9$^a$, 9$^b$. A rotatable socket 1 is fitted in the enlarged head of a bar or plate 2, and it may be locked immovably by a sliding catch 3. This catch is applied to one side of the bar or plate 2, and on the opposite side (see Fig. 9$^b$) are applied a ratchet 4 and a spring-pawl 5. The ratchet is fast on the socket 1, which, it will be understood, is adapted to receive the squared ends of the shaft E. A laterally-projecting handle 6 is secured to a tubular catch 7, that slides on the shank or reduced portion of the plate 2, and a spiral spring 8 is interposed between the parts 6 7 and the head 2$^a$ of the plate 2. The lower end of the tubular catch 7 is provided with insets or notches, which when the handle is adjusted, as shown in Fig. 9$^b$, receive the shoulders of the plate 2, and thus lock the parts together.

In Fig. 9$^a$ the turning device is shown elevated and the spiral spring 8 compressed, this being the relation of parts when the handle is being adjusted from one position or angle to another, and in Fig. 9 the tubular catch is shown in the position for engaging the shoulders of the plate 2. It is obvious that the handle 6 may be used on either side of the plate 2 and that the device B may be rotated bodily, or it may be oscillated as convenience may dictate. It is thus adapted to be used on either side of the wagon and on either end of the shaft E'. It is apparent that if the latter be rotated the body A may be turned, as required, for dumping on the side or at the front. In Fig. 4 it is shown in the side-dumping position. In order to place it in the proper position for dumping, it requires to be slid on the supporting-frame, and for this purpose I provide the following means: The wagon-body is hinged at P to the rear end of a rack-bar K, that extends centrally and longitudinally underneath the wagon-body and whose forward end is provided, as shown best in Fig. 10, with a slidable spring-latch L. A catch n is secured to the under side of the wagon-body at the front end thereof and consists of a plate bent at a right angle and its pendent end notched and provided with shoulders, which adapt it to respectively receive the end of the rack-bar K and engage with the shoulders of the latch L. The latter extends rearward underneath the rack-bar K and has a pendent thumb-piece l. It is held normally restricted by a spiral spring l', which is attached to its front end and to a lug l², forming an attachment of the rack-bar K. In Fig. 10 it is shown engaged or locked with the catch n on the wagon-body; but it is apparent that by pushing forward against the thumb-piece l the parts L and n will be disengaged and the front end of the wagon-body A will thus be left free to rise, leaving the rack-bar horizontal. Previous to this release, however, the wagon-body is moved bodily rearward or sidewise or to the front, as the case may be, by rotating the shaft E, which is provided with a pinion J, that engages the rack-bar K. The wagon-body is provided underneath on each side with a rod M, that extends lengthwise and is fitted in a grooved guide N. (See Figs. 12 and 13.) A guideway N is also shown in plan view in Fig. 2. Before the wagon-body can be slid from its normal position by means of the shaft E, pinion J, and rack K the latter must be released from a lock, (see Figs. 11 and 11ª,) the same being formed by a lug O, which is pendent from a rod O' and is adapted to enter a lateral notch k, formed in the rack-bar K. The said rod O' is extended across the running-gear, (see Fig. 2,) and its ends are provided with rings to adapt it to be pulled or pushed longitudinally, as required, to release the lock. Such release is effected against the tension and opposition of a spiral spring R, which is attached to a lug on a cross-bar and connected with guide-arms which are riveted to the shaft O' and embrace and slide upon the adjacent frame-bar.

From the foregoing description it is apparent that the operation of dumping the load of the wagon-box A is accomplished as follows: By rotating the shaft E' the wagon-body may be turned to the side or front; but when it is to be dumped in the rear, as shown in Fig. 3, of course this shaft is not rotated. Whatever be the side on which the dumping is to be effected the wagon-body is slid on the supporting-frame, and to permit this to be done the rod O' is pulled or pushed against the tension of the spring R to release the locking-lug O from the notch in the rack-bar K, and then the turning device B being applied to the shaft E on one side or the other, as the case may be, the wagon-body is moved rearward, its side rods M, Fig. 12, then sliding in the guides N, forming fixed portions of the frame, are attached to the running-gear. When the body A has been run back far enough through the medium of the shaft E and the rack and pinion, the latch L must be pushed forward in order to release it from the catch n, (see Fig. 10,) and then the wagon-body may be easily turned upon its hinge P. When the load has been discharged, the wagon-body is swung back to the horizontal position and the catch n automatically reëngages with the latch L, so as to hold the body in such position, and then the shaft E being rotated the wagon-body is slid back to its normal position on the supporting-frame of the running-gear.

I claim—

1. The combination with running-gear, having a frame and a circular bearing supported thereon, of a tilting wagon-body having a circular bearing adapted to rest and turn upon the first-named one, and hinged to such bearing, a worm-wheel whose shaft is connected with the latter bearing, and a transverse shaft having a worm which engages the said wheel, said shaft having its bearings in the frame of the running-gear, substantially as described.

2. The combination with a running-gear and a frame having a circular bearing, of a wagon-body having longitudinal guides, a rack-bar to whose rear end the wagon-body is hinged, said rack-bar being held slidably but horizontally in the frame supported on the bearing of the running-gear, means for locking and releasing such rack-bar, and means for sliding it longitudinally for adjusting the wagon-body to the dumping position, substantially as described.

3. The combination with a running-gear, and a frame having a circular bearing, of a wagon-body having also a circular bearing resting and adapted to rotate upon the first-named one, a rack-bar arranged longitudinally beneath the wagon-body and hinged to the latter, the said rack-bar being arranged to slide in guideways provided in the frame, means for engaging the rack-bar for causing it to travel longitudinally as required to place the wagon-body in a dumping position, and means for locking the front end of the wagon-body with the front end of the rack-bar, substantially as described.

4. The combination with a running-gear and a frame having a circular bearing, of a wagon-body having a circular bearing adapted to rest and turn upon the first-named one, a rack-bar arranged longitudinally under the wagon-body and hinged to the latter, such bar being held horizontally but adapted to slide, a spring-latch affixed to the front end of the rack-bar, and a catch attached to and pendent from the front end of the wagon and adapted to automatically engage the spring-latch substantially as described.

Signed at the city of New York, in the county of New York and State of New York, this 3d day of October, A. D. 1905.

PETER PINTO.

Witnesses:
　WILLIAM SCHNAUFER,
　STEPHEN D. LAPPIM.